(12) United States Patent
Bunke

(10) Patent No.: US 12,063,724 B2
(45) Date of Patent: Aug. 13, 2024

(54) VEHICLE BRAKE LIGHT SYSTEM

(71) Applicant: Melissa Bunke, Aberdeen, SD (US)

(72) Inventor: Melissa Bunke, Aberdeen, SD (US)

( * ) Notice: Subject to any disclaimer, the term of this patent is extended or adjusted under 35 U.S.C. 154(b) by 65 days.

(21) Appl. No.: 17/964,247

(22) Filed: Oct. 12, 2022

(65) Prior Publication Data

US 2024/0130015 A1   Apr. 18, 2024

(51) Int. Cl.
*H05B 45/20* (2020.01)
*B60Q 1/44* (2006.01)
*F21S 43/14* (2018.01)
*F21Y 115/10* (2016.01)

(52) U.S. Cl.
CPC ............ *H05B 45/20* (2020.01); *B60Q 1/444* (2013.01); *F21S 43/14* (2018.01); *F21Y 2115/10* (2016.08)

(58) Field of Classification Search
CPC ......... H05B 45/20; B60Q 1/444; F21S 43/14; F21Y 2115/10
See application file for complete search history.

(56) References Cited

U.S. PATENT DOCUMENTS

| | | | |
|---|---|---|---|
| 10,081,297 B1 * | 9/2018 | Yelda | H05B 45/10 |
| 2009/0322508 A1 * | 12/2009 | Malik | B60Q 1/447 |
| | | | 340/471 |
| 2017/0066368 A1 * | 3/2017 | Miller | B60Q 1/08 |
| 2022/0295623 A1 * | 9/2022 | Inoue | B60Q 1/2607 |
| 2024/0011617 A1 * | 1/2024 | Frederickson | B60Q 1/2661 |

FOREIGN PATENT DOCUMENTS

| | | | |
|---|---|---|---|
| DE | 102017116344 A1 * | 1/2019 | |
| KR | 200341285 Y1 * | 4/2004 | |
| KR | 101139429 B1 * | 4/2012 | |
| WO | WO-2020159345 A1 * | 8/2020 | |

* cited by examiner

*Primary Examiner* — Curtis A Kuntz
*Assistant Examiner* — James E Munion
(74) *Attorney, Agent, or Firm* — The Iwashko Law Firm, PLLC; Lev Ivan Gabriel Iwashko

(57) ABSTRACT

A vehicle brake light system connected to a brake of a vehicle, the vehicle brake light system including at least one graduated tail light, including a a plurality of lights to illuminate a plurality of colors in response to the brake of the vehicle being depressed at a plurality of levels of force, and a brake sensor connected to the brake of the vehicle to detect a level of force on the brake.

4 Claims, 1 Drawing Sheet

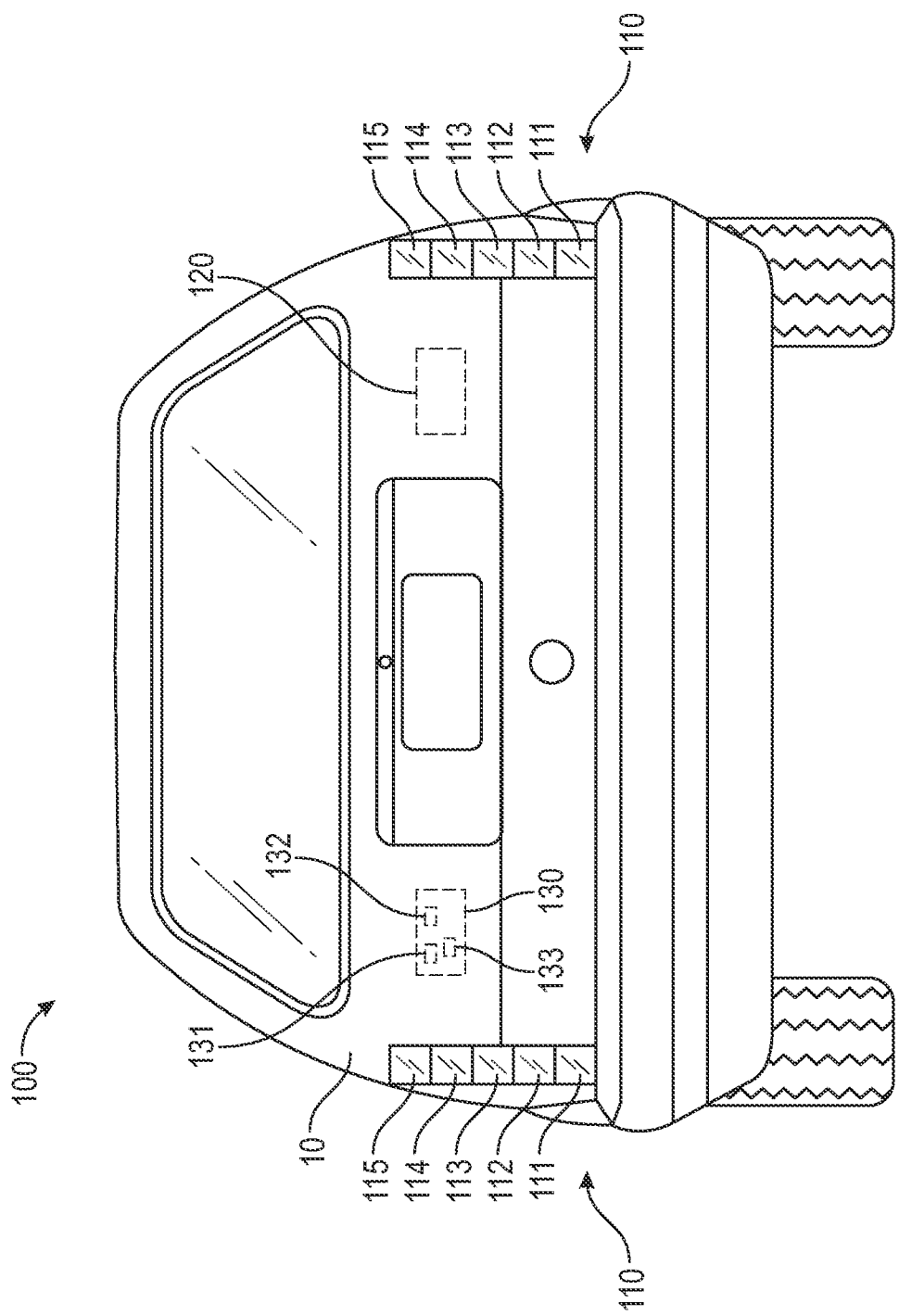

VEHICLE BRAKE LIGHT SYSTEM

BACKGROUND

1. Field

The present general inventive concept relates generally to brake lights, and particularly, to a vehicle brake light system.

2. Description of the Related Art

Driving includes control and movement of a vehicle, such as a car, a truck, a bus, a van, and/or a motorcycle. Moreover, driving requires a constant awareness of driving rules established by state and/or federal laws, as well as, a surrounding environment. A driver must be vigilant of other vehicles and/or pedestrians while driving.

At any given moment, the driver will have to brake the vehicle in order to slow down and/or come to a complete stop. Unfortunately, reaction time for braking varies widely depending on the circumstances. For example, approaching a red light and/or a stop sign can result in a gradual slow down, which would require minimal force on a brake pedal. On the other hand, a sudden lane change by another driver into the driver's lane can cause surprise and rapid and/or hard braking. However, vehicles on the road will illuminate brake lights with similar intensity regardless of how hard the driver is braking.

Therefore, there is a need for a vehicle brake light system that illuminates differently based on the intensity and/or rapidity for which the brake in the vehicle is being depressed.

SUMMARY

The present general inventive concept provides a vehicle brake light system.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a vehicle brake light system connected to a brake of a vehicle, the vehicle brake light system including at least one graduated tail light, including a first light to illuminate a first color in response to the brake of the vehicle being depressed at a first level of force, a second light disposed on at least a portion of the first light to illuminate a second color in response to the brake of the vehicle being depressed at a second level of force, a third light disposed on at least a portion of the second light to illuminate a third color in response to the brake of the vehicle being depressed at a third level of force, a fourth light disposed on at least a portion of the third light to illuminate a fourth color in response to the brake of the vehicle being depressed at a fourth level of force, and a fifth light disposed on at least a portion of the fourth light to illuminate a fifth color in response to the brake of the vehicle being depressed at a fifth level of force, and a brake sensor connected to the brake of the vehicle to detect a level of force on the brake.

The first light, the second light, the third light, the fourth light, and the fifth light may simultaneously illuminate in response to the brake of the vehicle being depressed at the fifth level of force.

The first level of the force may be a lowest level of force and the fifth level of force is a maximum level of force.

The first light, the second light, the third light, the fourth light, and the fifth light may flash only in response to the fifth level of force being applied.

The vehicle brake light system may further include a control unit connected to the brake sensor to determine the level of force on the brake of the vehicle based on a sensor signal received from the brake sensor.

BRIEF DESCRIPTION OF THE DRAWINGS

These and/or other features and utilities of the present generally inventive concept will become apparent and more readily appreciated from the following description of the embodiments, taken in conjunction with the accompanying drawings of which:

FIG. 1 illustrates a perspective view of a vehicle brake light system as disposed on a vehicle, according to an exemplary embodiment of the present general inventive concept.

DETAILED DESCRIPTION

Various example embodiments (a.k.a., exemplary embodiments) will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like/similar elements throughout the detailed description.

It is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

List of Components

Vehicle Brake Light System 100
Graduated Tail Lights 110
First Light 111
Second Light 112
Third Light 113
Fourth Light 114
Fifth Light 115
Brake Sensor 120
Control Unit 130

FIG. 1 illustrates a perspective view of a vehicle brake light system 100 as disposed on a vehicle 10, according to an exemplary embodiment of the present general inventive concept.

The vehicle brake light system 100 may be constructed from at least one of metal, glass, plastic, and rubber, etc., but is not limited thereto.

The vehicle brake light system 100 may include a plurality of graduated tail lights 110, a brake sensor 120, and a control unit 130, but is not limited thereto.

Referring to FIG. 1, the graduated tail lights 110 is illustrated to have a rectangular prism shape. However, the graduated tail lights 110 may be rectangular, circular, cylindrical, triangular, pentagonal, hexagonal, heptagonal, octagonal, or any other shape known to one of ordinary skill in the art, but is not limited thereto.

Each of the plurality of graduated tail lights 110 may include a first light 111, a second light 112, a third light 113, a fourth light 114, and a fifth light 115, but is not limited thereto.

The first light 111, the second light 112, the third light 113, the fourth light 114, and/or the fifth light 115 may be a light-emitting diode (LED), an incandescent bulb, a halogen bulb, a fluorescent bulb, and a xenon arc lamp, but is not limited thereto.

The first light 111 may be disposed at a first end of each of the plurality of graduated tail lights 110. The first light 111 may illuminate a first color (e.g., green) in response to a brake of a vehicle 10 being depressed at a first level of force (e.g., an application of force by a user or a driver). Accordingly, the first level of force may be a lowest level of force.

The second light 112 may be disposed on at least a portion of the first light 111 between the first light 111 and the third light 113. The second light 112 may illuminate a second color (e.g., yellow, light orange) in response to the brake of the vehicle 10 being depressed at a second level of force greater than the first level of force.

The third light 113 may be disposed on at least a portion of the second light 111 between the second light 112 and the fourth light 114. The third light 113 may illuminate a third color (e.g., orange that is darker than the second color) in response to the brake of the vehicle 10 being depressed at a third level of force greater than the second level of force.

The fourth light 114 may be disposed on at least a portion of the third light 113 between the third light 113 and the fifth light 115. The fourth light 114 may illuminate a fourth color (e.g., dark orange that is darker than the third color) in response to the brake of the vehicle 10 being depressed at a fourth level of force greater than the third level of force.

The fifth light 115 may be disposed on at least a portion of a second end of each of the plurality of graduated lights 110 opposite with respect to the first end of each of the plurality of graduated lights 110. The fifth light 115 may illuminate a fifth color (e.g., red) in response to the brake of the vehicle 10 being depressed at a fifth level of force greater than the fourth level of force. Accordingly, the fifth level of force may be a maximum level of force.

It is important to note that a type of color used indicates intensity and/or urgency of braking to another driver of another vehicle 10.

The brake sensor 120 may be disposed within at least a portion of the vehicle 10 and/or connected to the brake of the vehicle 10. The brake sensor 120 may detect a level of force (e.g., an application of force) on the brake.

The control unit 130 may include a processing unit 131, a communication unit 132, and a storage unit 133, but is not limited thereto.

The processing unit 131 (or central processing unit, CPU) may include electronic circuitry to carry out instructions of a computer program by performing basic arithmetic, logical, control and input/output (I/O) operations specified by the instructions. The processing unit 131 may include an arithmetic logic unit (ALU) that performs arithmetic and logic operations, processor registers that supply operands to the ALU and store the results of ALU operations, and a control unit that fetches instructions from memory and "executes" them by directing the coordinated operations of the ALU, registers and other components. The processing unit 131 may also include a microprocessor and a microcontroller.

The communication unit 132 may include a device capable of wireless or wired communication between other wireless or wired devices via at least one of Wi-Fi, Wi-Fi Direct, infrared (IR) wireless communication, satellite communication, broadcast radio communication, Microwave radio communication, Bluetooth, Bluetooth Low Energy (BLE), Zigbee, near field communication (NFC), and radio frequency (RF) communication, USB, Firewire, and Ethernet.

The storage unit 133 may include a random access memory (RAM), a read-only memory (ROM), a hard disk, a flash drive, a database connected to the Internet, cloud-based storage, Internet-based storage, or any other type of storage unit.

The control unit 140 may access the Internet via the communication unit 132 to allow the user to access a website, and/or may allow a mobile application and/or a software application to be executed using the processing unit 131. For ease of description, the mobile application and/or the software application will be hereinafter referred to as an app. The app may be downloaded from the Internet to be stored on the storage unit 133.

The control unit 130 may be disposed within at least a portion of the vehicle 10 and/or connected to the plurality of graduated tail lights 110 and/or the brake sensor 120. The processing unit 131 executing the app may receive a sensor signal from the brake sensor 120 in response to the brake of the vehicle 10 being depressed. Moreover, the processing unit 131 may determine the level of force against the brake of the vehicle 10 by the user based on the sensor signal. The processing unit 131 may direct the communication unit 132 to send an illumination signal to the plurality of graduated tail lights 110. The plurality of graduated tail lights 110 may illuminate in response to receiving the illumination signal from the processing unit 131.

During use, the first light 111 may illuminate in response to the processing unit 131 determining the brake of the vehicle 10 has been depressed using the first level of force (e.g., light braking, slow braking). Next, the first light 111 and/or the second light 112 may illuminate in response to the processing unit 131 determining the brake of the vehicle 10 has been depressed using the second level of force (e.g., mild braking). The first light 111, the second light 112, and/or the third light 113 may illuminate in response to the processing unit 131 determining the brake of the vehicle 10 has been depressed using the third level of force (e.g., middle level braking). The first light 111, the second light 112, the third light 113, and/or the fourth light 114 may illuminate in response to the processing unit 131 determining the brake of the vehicle 10 has been depressed using the fourth level of force (e.g., strong braking). The first light 111, the second light 112, the third light 113, the fourth light 114, and/or the fifth light 115 may illuminate in response to the processing unit 131 determining the brake of the vehicle 10 has been depressed using the fifth level of force (e.g., very strong braking, hard braking).

Furthermore, the processing unit 131 may send a flash and/or a blink signal to the plurality of graduated tail lights 110 in response to determining the fifth level of force has been applied to the brake of the vehicle 10.

As such, the processing unit 131 may determine intensity of braking corresponding to situation of the user of the vehicle 10. Thus, the another driver in the another vehicle 10 following the vehicle 10 may identify the level of force being applied to the brake of the vehicle 10 and react accordingly.

Therefore, the vehicle brake light system 100 may illuminate based on the level of force applied to the brake of the vehicle 10. Also, the vehicle brake light system 100 may prevent accidents by indicating to other drivers of the level of force.

The present general inventive concept may include a vehicle brake light system 100 connected to a brake of a vehicle 10, the vehicle brake light system 100 including at least one graduated tail light 110, including a first light 111 to illuminate a first color in response to the brake of the vehicle 10 being depressed at a first level of force, a second light 112 disposed on at least a portion of the first light 111 to illuminate a second color in response to the brake of the vehicle 10 being depressed at a second level of force, a third light 113 disposed on at least a portion of the second light 112 to illuminate a third color in response to the brake of the vehicle 10 being depressed at a third level of force, a fourth light 114 disposed on at least a portion of the third light 113 to illuminate a fourth color in response to the brake of the vehicle 10 being depressed at a fourth level of force, and a fifth light 115 disposed on at least a portion of the fourth light 114 to illuminate a fifth color in response to the brake of the vehicle 10 being depressed at a fifth level of force, and a brake sensor 120 connected to the brake of the vehicle 10 to detect a level of force on the brake of the vehicle 10.

The first light 111, the second light 112, the third light 113, the fourth light 114, and the fifth light 115 may simultaneously illuminate in response to the brake of the vehicle 10 being depressed at the fifth level of force.

The first level of the force may be a lowest level of force and the fifth level of force is a maximum level of force.

The first light 111, the second light 112, the third light 113, the fourth light 114, and the fifth light 115 may flash only in response to the fifth level of force being applied.

The vehicle brake light system 100 may further include a control unit 130 connected to the brake sensor 120 to determine the level of force on the brake of the vehicle 10 based on a sensor signal received from the brake sensor 120.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

The invention claimed is:

1. A vehicle brake light system connected to a brake of a vehicle, the vehicle brake light system comprising:
   at least one graduated tail light, comprising:
      a first light to illuminate a first color in response to the brake of the vehicle being depressed at a first level of force,
      a second light disposed on at least a portion of the first light to illuminate a second color in response to the brake of the vehicle being depressed at a second level of force,
      a third light disposed on at least a portion of the second light to illuminate a third color in response to the brake of the vehicle being depressed at a third level of force,
      a fourth light disposed on at least a portion of the third light to illuminate a fourth color in response to the brake of the vehicle being depressed at a fourth level of force, and
      a fifth light disposed on at least a portion of the fourth light to illuminate a fifth color in response to the brake of the vehicle being depressed at a fifth level of force; and
   a brake sensor connected to the brake of the vehicle to detect a level of force on the brake, wherein the first light, the second light, the third light, the fourth light, and the fifth light flash only in response to the fifth level of force being applied, and
   wherein each of the first light, the second light, the third light, the fourth light, and the fifth light are disposed to be sequentially stacked on top of each other with the first light on top and the fifth light on the bottom.

2. The vehicle brake light system of claim 1, wherein the first light, the second light, the third light, the fourth light, and the fifth light simultaneously illuminate in response to the brake of the vehicle being depressed at the fifth level of force.

3. The vehicle brake light system of claim 1, wherein the first level of the force is a lowest level of force and the fifth level of force is a maximum level of force.

4. The vehicle brake light system of claim 1, further comprising:
   a control unit connected to the brake sensor to determine the level of force on the brake of the vehicle based on a sensor signal received from the brake sensor.

* * * * *